US008449975B2

(12) United States Patent
Hirakoso et al.

(10) Patent No.: US 8,449,975 B2
(45) Date of Patent: May 28, 2013

(54) ELECTROCONDUCTIVE MEMBER, PROCESS CARTRIDGE AND ELECTROPHOTOGRAPHIC APPARATUS

(75) Inventors: Yuka Hirakoso, Kounosu (JP); Satoru Yamada, Numazu (JP); Seiji Tsuru, Susono (JP); Kazuhiro Yamauchi, Suntou-gun (JP); Norifumi Muranaka, Mishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/305,262

(22) Filed: Nov. 28, 2011

(65) Prior Publication Data

US 2012/0070188 A1 Mar. 22, 2012

Related U.S. Application Data

(63) Continuation of application No. PCT/JP2011/003450, filed on Jun. 16, 2011.

(30) Foreign Application Priority Data

Jul. 20, 2010 (JP) ................................ 2010-163022

(51) Int. Cl.
*B32B 5/16* (2006.01)
*B32B 27/20* (2006.01)
*G03G 21/16* (2006.01)
*G03G 15/02* (2006.01)

(52) U.S. Cl.
USPC ............................ 428/323; 399/111; 399/168

(58) Field of Classification Search
None
See application file for complete search history.

(56) References Cited

U.S. PATENT DOCUMENTS

| | | | |
|---|---|---|---|
| 6,127,622 | A | 10/2000 | Yamada et al. |
| 7,947,339 | B2 | 5/2011 | Yamauchi et al. |
| 2005/0003275 | A1 | 1/2005 | Nagasawa |
| 2010/0150609 | A1 | 6/2010 | Nozaki et al. |
| 2010/0233551 | A1 | 9/2010 | Ogawa et al. |
| 2012/0020700 | A1 | 1/2012 | Yamada et al. |
| 2012/0027456 | A1 | 2/2012 | Muranaka et al. |

FOREIGN PATENT DOCUMENTS

| | | | | |
|---|---|---|---|---|
| JP | 10-7932 | A | | 1/1998 |
| JP | 2004-235111 | A | | 8/2004 |
| JP | 2007106936 | A | * | 4/2007 |
| JP | 2008-4533 | A | | 1/2008 |
| JP | 2009-214051 | A | | 9/2009 |
| JP | 2010-139832 | A | | 6/2010 |
| JP | 2011102844 | A | * | 5/2011 |

OTHER PUBLICATIONS

International Preliminary Report on Patentability dated Jan. 31, 2013 in International Application No. PCT/JP2011/003450.

* cited by examiner

*Primary Examiner* — Monique Jackson

(74) *Attorney, Agent, or Firm* — Fitzpatrick, Cella, Harper & Scinto

(57) ABSTRACT

An electroconductive member excellent in durability even when applying direct current voltage over a long period of time is provided. Disclosed is an electroconductive member including an electroconductive mandrel and an electroconductive layer, wherein: the electroconductive layer includes a binder resin and an electroconductive metal oxide particle dispersed in the electroconductive layer; the metal oxide particle has a group represented by the following structural formula (1) on the surface of the metal oxide particle; and the group represented by the following structural formula (1) is introduced by substituting a hydrogen atom of a hydroxyl group as a functional group originating from the metal oxide particle, with the group represented by the following structural formula (1):

$$—R—SO_3H.$$

5 Claims, 5 Drawing Sheets

ELECTROCONDUCTIVE MEMBER, PROCESS CARTRIDGE AND ELECTROPHOTOGRAPHIC APPARATUS

CROSS-REFERENCE TO RELATED APPLICATIONS

This application is a continuation of International Application No. PCT/JP2011/003450, filed Jun. 16, 2011, which claims the benefit of Japanese Patent Application No. 2010-163022, filed Jul. 20, 2010.

BACKGROUND OF THE INVENTION

1. Field of the Invention

The present invention relates to an electroconductive member used in an electrophotographic apparatus and a process cartridge using the electroconductive member and the like.

2. Description of the Related Art

The electroconductive member used in an electrophotographic apparatus, typified by an electroconductive roller, commonly has an electroconductive mandrel and an electroconductive layer provided on the outer periphery of the electroconductive mandrel. The electroconductive layer usually includes a binder resin and an electroconductive agent as dispersed in the binder resin. As an electroconductive agent capable of comparatively easily reducing the electrical resistance of the electroconductive layer, electronic conductive agents such as electroconductive metal oxide particles are known. However, an electroconductive layer made electroconductive with an electronic conductive agent may undergo a large variation of the electrical resistance thereof depending on the dispersion condition of the electronic conductive agent in the electroconductive layer. For the purpose of suppressing the variation of the electrical resistance of the electroconductive layer and thus obtaining an electroconductive member stable in quality, an electronic conductive agent having a satisfactory dispersibility in the binder resin constituting the electroconductive layer has been demanded. Japanese Patent Application Laid-Open No. H10-7932 discloses an electroconductive inorganic powder in which a sulfonic acid group having ion conductivity is introduced by a silane coupling treatment onto the surface of an inorganic powder, as an inorganic powder low in resistance and excellent in uniform dispersibility in resins.

SUMMARY OF THE INVENTION

The present inventors made a study of the electroconductive member provided with an electroconductive layer which was made electroconductive by using the electroconductive inorganic powder according to Japanese Patent Application Laid-Open No. H10-007932. Consequently, there has been found that the inorganic powder is excellent in the dispersibility in the binder resin, and also has an effect to stabilize the electrical resistance of the electroconductive layer. However, it has been found that when the electroconductive member was used for a charging member, and a direct current voltage was applied over a long period of time, the electrical resistance of the electroconductive layer was increased with time as the case may be.

Accordingly, the present invention is directed to provide an electroconductive member in which the electrical resistance is hardly varied even by a long term application of a direct current voltage. Further, the present invention is directed to provide an electrophotographic apparatus and a process cartridge, capable of stably providing high quality electrophotographic images.

According to one aspect of the present invention, there is provided an electroconductive member comprising an electroconductive mandrel and an electroconductive layer, wherein: the electroconductive layer comprises a binder resin and an electroconductive metal oxide particle dispersed in the binder resin; the metal oxide particle has a group represented by the following structural formula (1) on the surface of the metal oxide particles; and wherein the group represented by the following structural formula (1) is a group introduced by substituting a hydrogen atom of a hydroxyl group as a functional group originating from the metal oxide particle, with the group represented by the following structural formula (1):

$$-R-SO_3H \quad (1)$$

wherein, in the structural formula (1), R represents a divalent saturated hydrocarbon group having 1 to 4 carbon atoms.

According to another aspect of the present invention, there is provided a process cartridge formed so as to be attachable to and detachable from the main body of an electrophotographic apparatus, wherein said process cartridge comprises the above-described electroconductive member as at least one of a charging member and a developing member. According to further aspect of the present invention, there is provided an electrophotographic apparatus comprising the above-described electroconductive member as at least one of a charging member and a developing member.

According to the present invention, there can be obtained an electroconductive member excellent in durability in such a way that the electrical resistance of the electroconductive member is hardly changed even by applying a direct current voltage over a long period of time. Also, according to the present invention, there can be obtained a process cartridge and an electrophotographic apparatus, stably providing high quality electrophotographic images.

Further features of the present invention will become apparent from the following description of exemplary embodiments with reference to the attached drawings.

DESCRIPTION OF THE EMBODIMENTS

The present inventors made a series of studies on the mechanism of the electrical resistance variation, due to the long-term application of direct current voltage, in the electroconductive member provided with an electroconductive layer which was made electroconductive with the electroconductive inorganic powder according to aforementioned Japanese Patent Application Laid-Open No. H10-007932. Consequently, the present inventors have found that a cause for the concerned electrical resistance variation is ascribable to the introduction of the ion exchange groups such as sulfonic acid groups in the silane coupling treatment.

Figure 1:
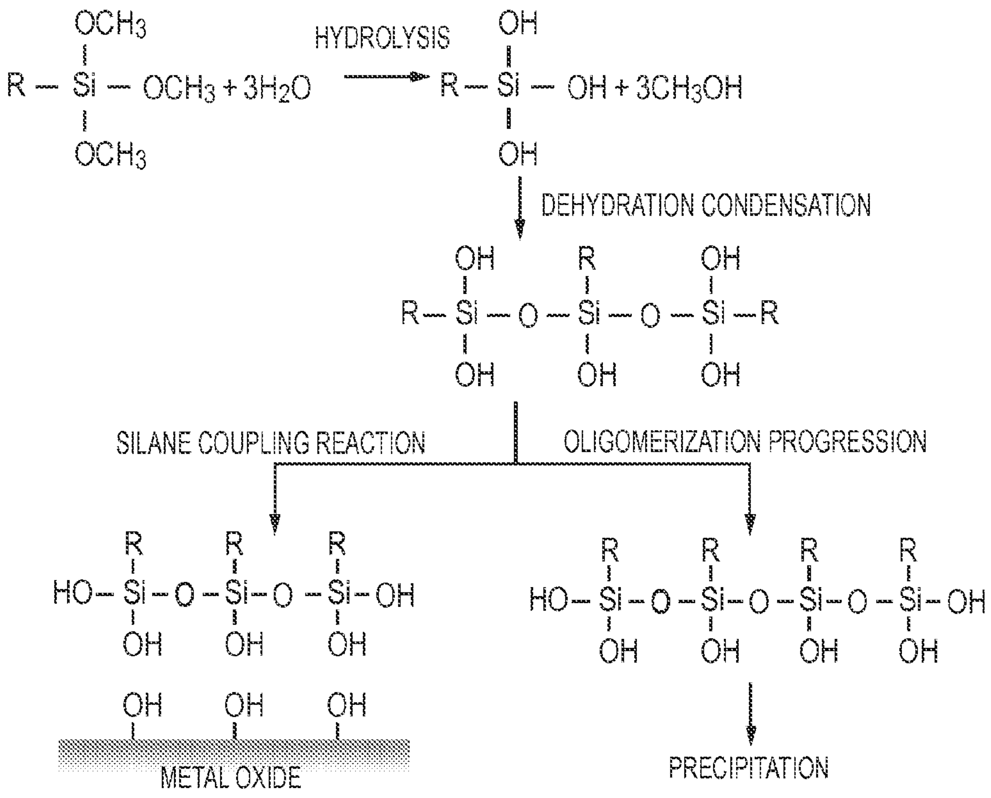
PRIOR ART FIG. 1
FIG. 1 is a schematic diagram illustrating the action mechanism of the silane coupling reaction.

FIG. 1 is a diagram illustrating the action mechanism of the silane coupling reaction. The alkoxy group of the silane coupling agent is hydrolyzed in water, and successively dehydration condensation occurs between the silanol groups to produce an oligomer-like siloxane. Covalent bonds are formed, through dehydration condensation, between part of the hydroxyl groups of the produced oligomer-like siloxane and the hydroxyl groups on the surface of the metal oxide particles. Consequently, sulfonic acid groups are introduced onto the surface of the metal oxide.

However, it is understood that the reaction in which the reaction producing the oligomer-like siloxane through the mutual condensation between the hydroxy groups produced by hydrolysis of the alkoxy groups in the silane coupling agent and the reaction between the concerned hydroxy groups and the hydroxyl groups on the surface of the metal oxide proceed competitively with each other at the beginning. It is also understood that with the oligomerization progression of the silane coupling agent, because of the relative low molecular mobility of the concerned oligomerized siloxane, the reaction between the hydroxy groups in the concerned oligomerized siloxane and the hydroxyl groups on the surface of the metal oxide particles is made difficult to occur. Consequently, the oligomerized siloxane is held on the surface of the metal oxide particles through a smaller number of covalent bonds.

Figure 5:
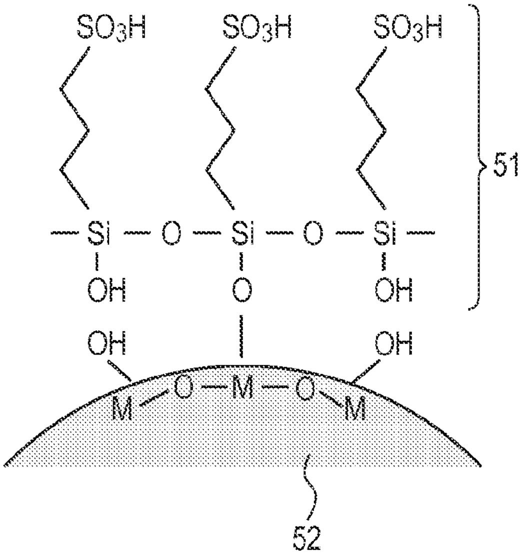
PRIOR ART FIG. 5
FIG. 5 is a diagram illustrating the metal oxide particle having sulfonic acid groups introduced by a conventional method.

Specifically, as schematically shown in FIG. 5, this situation is such that the oligomerized siloxane 51 is bonded to the surface of the metal oxide particle 52 through a single covalent bond. In other words, it may be assumed that there occurs the condition such that a macromolecule barely stays on the surface of the metal oxide particles through a small number of covalent bonds. Accordingly, it is understood that the long term application of a direct current voltage breaks the covalent bonds between the oligomerized siloxane and the metal oxide particles, and thus oligomerized siloxane having sulfonic acid groups is isolated to lead to the variation of the electrical resistance.

Figure 3:
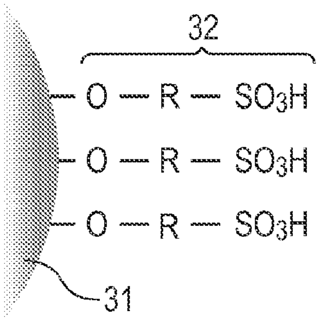
FIG. 3 is a schematic diagram illustrating a metal oxide particle according to the present invention.
Figure 4:
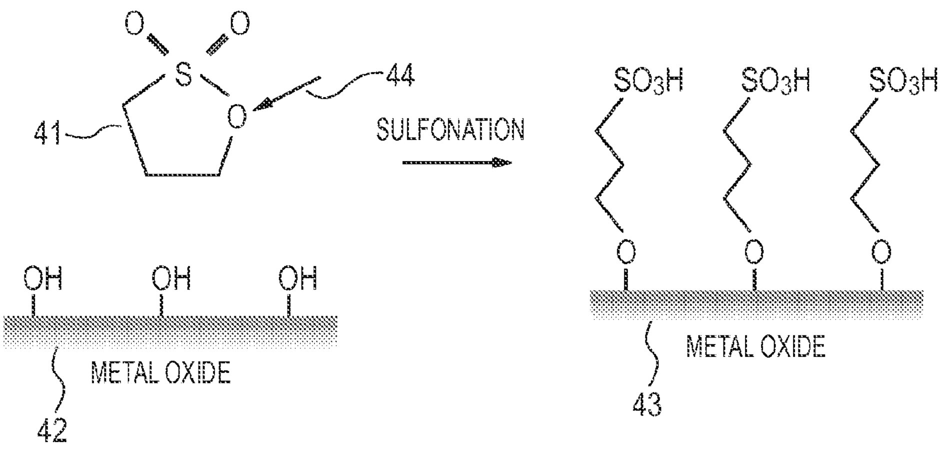
FIG. 4 is a schematic diagram illustrating the mechanism of the sulfonation reaction using sultone.

On the contrary, as shown in FIGS. 3 and 4, the metal oxide particle 31 according to the present invention has on the surface thereof organic groups containing groups relatively small in size and represented by the following structural formula (1). The groups represented by the structural formula (1) are each introduced to the metal oxide particle by substituting, with the group represented by the structural formula (1), the hydrogen atom of the hydroxyl group as the surface functional group intrinsically possessed by the metal oxide particle.

$$R—SO_3H \quad (1)$$

wherein, in the structural formula (1), R represents a divalent saturated hydrocarbon group having 1 to 4 carbon atoms.

Accordingly, it is inferred that even the long term application of the direct current voltage hardly isolates the sulfonic acid group from the metal oxide particle, and consequently, the electroconductive layer made electroconductive with such metal oxide particles is reduced in the variation with time of the electrical resistance thereof.

Figure 2:
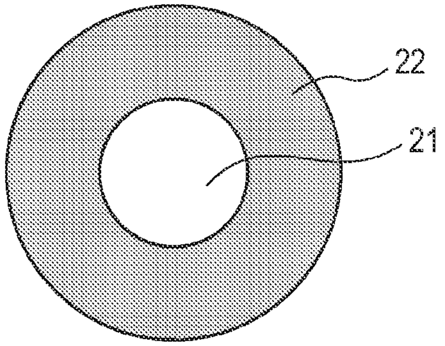
FIG. 2 is a schematic view illustrating an electroconductive member according to the present invention.

FIG. 2 is a cross-sectional view of an electroconductive roller according to the present invention, in the direction perpendicular to the axis of the roller. The electroconductive roller includes a mandrel 21 as an electroconductive mandrel and an electroconductive layer 22 provided on the outer periphery of the mandrel 21. The electroconductive layer 22 includes the electroconductive metal oxide particle having sulfonic acid groups (—$SO_3H$) and a binder resin having the metal oxide particle as dispersed therein.

<Metal Oxide Particle>

The metal oxide particle according to the present invention has on the surface thereof the group represented by the following structural formula (1), and this group is introduced by substituting, with the group represented by the structural formulas (1), the hydrogen atom of the hydroxyl group as the surface functional group intrinsically possessed by the metal oxide particle.

$$—R—SO_3H \quad (1)$$

wherein, in the structural formula (1), R represents a divalent saturated hydrocarbon group having 1 to 4 carbon atoms.

FIG. 3 is a schematic diagram illustrating a metal oxide particle having sulfonic acid groups introduced thereonto. FIG. 3 shows the condition that the hydrogen atoms of the hydroxyl groups, originating from the metal oxide particle, on the surface of the metal oxide particle 31 are substituted with sulfonic acid groups.

The metal oxide particle is a metal oxide particle intrinsically having hydroxyl groups on the surface thereof. Specific examples of such a metal oxide particle include the particles containing the oxides of Si, Mg, Al, Ti, Zr, V, Cr, Mn, Fe, Co, Ni, Cu, Sn and Zn. More specifically, examples of such a metal oxide particle include the following metal oxide particles: spherical and acicular particles of silica, titanium oxide, aluminum oxide, alumina sol, zirconium oxide, iron oxide and chromium oxide: particles of layered clay minerals such as silicate minerals, phosphate minerals, titanate minerals, manganate minerals and niobate minerals; and particles of porous titanium oxide, zeolite, mesoporous silica, porous alumina, porous silica alumina and diatomaceous earth.

In the present invention, the amount of the hydroxyl group on the surface of a metal oxide particle affects the ionic conductivity. The sulfonic acid groups are introduced by the substitution of the hydroxyl groups present on the surface of the metal oxide particle, and hence the larger is the number of the hydroxyl groups on the surface of the metal oxide particle, the better the metal oxide particle is. Examples of the metal oxides relatively larger in the number of the hydroxyl groups present on the surface thereof include silica and titanium oxide.

Specific examples of silica include fumed silica, colloidal silica, precipitated silica, crystalline silica, pulverized silica and fused silica. Specific examples of titanium oxide include titania sol.

Examples of the layered clay minerals include silicate minerals, and specific examples include the following: the mica group (muscovite, biotite, annite, phlogopite, shirozulite, paragonite, siderophylite, eastonite, polylithionite, trilithionite, lepidolite, zinnwaldite, margarite, illite and glauconite); smectite group (montmorillonite, beidellite, nontronite, saponite, hectorite, stevensite and talc); kaolin group (kaolinite and halloysite); vermiculite; magadiite; kanemite; and kenyaite. Particularly preferable among these are montmorillonite, magadiite, kanemite and kenyaite.

Any of the metal oxide particles can also be increased, where necessary, in the amount of the hydroxyl groups on the surface thereof by applying treatments such as UV treatment and hydrothermal treatment. As the shape of the metal oxide particle, any of the shapes such as spherical, rod-like, acicular and plate-like shapes can be used. Additionally, it does not matter whether the particles are porous or nonporous.

In the present invention, the standard of the average particle size of the metal oxide particle, as determined by the particle size distribution measurement based on the laser diffraction/scattering method, is 50 nm or more and 500 nm or less. The average particle size of the metal oxide particle, controlled to fall within such a range as described above, enables to more certainly suppress the mutual aggregation of the metal oxide particles when the metal oxide particles having sulfonic acid groups introduced thereonto are mixed with the binder resin such as a synthetic rubber. The average particle size falling within such a range as described above also enables to effectively suppress the increase of the resistance to high values due to the decrease of the introduced amount of the sulfonic acid group per unit mass of the metal oxide particle.

<Method for Producing Metal Oxide Particle>

The method for producing the metal oxide particle according to the present invention is described.

Examples of the method for introducing the sulfonic acid group onto the surface of the metal oxide particle include sulfonation using sultone and a nucleophilic displacement reaction between an alkyl halide having a sulfonic acid group and the hydroxyl group on the surface of the metal oxide particle.

FIG. 4 shows an outline of the mechanism of the sulfonation reaction using sultone. The oxygen atom in the hydroxyl group on the surface 42 of the metal oxide particle nucleophilically reacts with the carbon atom adjacent to the oxygen atom 44 of sultone 41, and consequently, a metal oxide particle having sulfonic acid groups on the surface thereof is obtained. In other words, the sulfonation reaction using sultone introduces one sulfonic acid group per one hydroxyl group onto the surface of the metal oxide particle to form a stable covalent bond.

This reaction produces no oligomers, and enables a one-stage reaction to introduce sulfonic acid groups onto the surface of the metal oxide particle. Additionally, the unreacted sultone remains dissolved in the reaction solution, and can be removed by filtration under reduced pressure after the introduction of the sulfonic acid groups, at the time of the purification of the metal oxide particles. In other words, even when the synthesized metal oxide particles are mixed in the binder resin, impurities such as oligomers are not mixed.

As sultone, the sultone compound represented by the following structural formula (2) can be used.

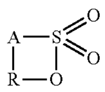

(2)

In the foregoing structural formula (2), R is a substituted or nonsubstituted alkylene group having 1 or 2 carbon atoms or a nonsubstituted alkenylene group having 1 or 2 carbon atoms, A is —C(R')(R")—, and R' and R" are each independently a hydrogen atom or an alkyl group having 1 or carbon atoms. Examples of the sultone compound represented by the structural formula (2) include the sultone compounds represented by the following structural formulas, namely, 1,3-propanesultone (A), 1,3-propenesultone (B), 1,4-butanesultone (C) and 2,4-butanesultone (D).

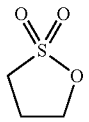

(A)

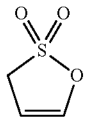

(B)

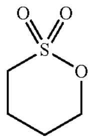

(C)

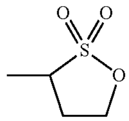

(D)

The sulfonation reaction is performed by adding the aforementioned sultone compounds. In an organic solvent, the dispersed metal oxide particles and sultone are allowed to react with each other for 6 to 24 hours, and thus, metal oxide particles having sulfonic acid groups introduced onto the surface thereof can be obtained.

Figure 6:
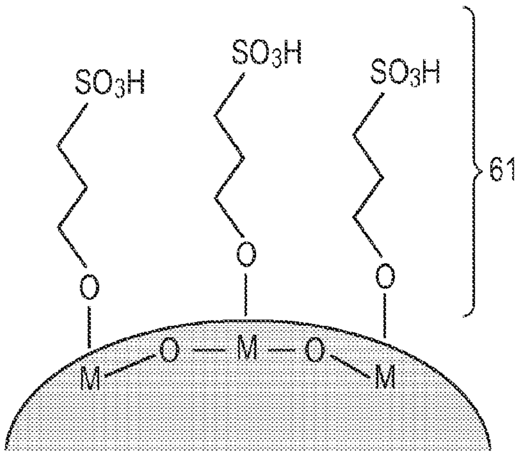
FIG. 6 is a diagram illustrating a metal oxide particle having sulfonic acid groups introduced by the method of the present invention.

In the case of the metal oxide particle in which sulfonic acid groups are introduced by the sulfonation reaction using sultone, the metal (M)-O—C— bonds are present as shown in FIG. 6. On the other hand, in the case of the metal oxide particle in which sulfonic acid groups are introduced by a silane coupling reaction, the M-O—Si—C— bonds are present as shown in FIG. 5. On the basis of these different bonds, it is possible to distinguish between the metal oxide particle in which sulfonic acid groups are introduced by a silane coupling reaction and the metal oxide particle in which sulfonic acid groups are introduced by the sulfonation reaction using sultone, according to the present invention. Specifically, it is only required to identify the presence or absence of the oxygen atom (-M-O—C—) chemically bonded to the metal M on the surface of the metal oxide. For example, a combination of the proton nuclear magnetic resonance ($^{1}$H-NMR) method and the $^{13}$C nuclear magnetic resonance method ($^{13}$C-NMR), as a technique for such identification, enables the identification of the presence or absence of the aforementioned oxygen atom.

<Electroconductive Layer>

In the present invention, the electroconductive layer includes a binder resin, and in the binder resin, the electroconductive metal oxide particle is dispersed. As the binder resin, heretofore known rubbers or resins can be used, without any particular limitation. From the viewpoint of ion conductivity, it is preferable to use rubbers having polarity; examples of such rubbers include: epichlorohydrin homopolymer, epichlorohydrin-ethylene oxide copolymer, epichlorohydrin-ethylene oxide-allyl glycidyl ether ternary copolymer, acrylonitrile-butadiene copolymer, hydrogenated products of acrylonitrile-butadiene copolymer, acrylic rubber and urethane rubber. These rubbers may be used each alone or in combinations of two or more thereof.

Further, within a range not to impair the advantageous effects of the present invention, the following commonly used as the compounding ingredients for rubber can be added where necessary: for example, a filler, a softener, a processing aid, a cross-linking aid, a cross-linking promoter, a cross-linking promoting aid, a cross-linking retarder, a tackifier, a dispersant and a foaming agent.

The content of the metal oxide particle, having sulfonic acid groups as introduced thereonto, used as an electroconductive agent is not particularly limited as long as the volume intrinsic resistivity of the electroconductive layer can be regulated to fall within a range from $1\times10^3$ to $1\times10^9$ Ω·cm so that the electroconductive member may perform the charging treatment of the electrophotographic photosensitive member by applying voltage. However, the standard of the mixing amount is 0.5 to 30 parts by mass, in particular, 1 to 10 parts by mass in relation to 100 parts by mass of the binder resin.

Examples of the method for mixing the binder resin and the electroconductive metal oxide particle may include: a mixing method using a closed type mixer such as a Banbury mixer or a pressure kneader, and a mixing method using an open type mixer such as an open roll.

When the electroconductive member is the charging member (charging roller) or the developing member (developing roller) used in an electrophotographic image forming apparatus, the electroconductive member is preferably such that the outermost portion, in contact with the photosensitive member, of the electroconductive member is subjected to a non-adhesion treatment, for the purpose of preventing the adhesion of the toner or external additives. As shown in FIG. 2, the structure of the electroconductive member may be a single layer structure including a mandrel 21 and an electroconductive layer 22 provided on the outer periphery of the mandrel 21, or a double layer structure in which another layer is further laminated on the electroconductive layer 22. Moreover, the structure of the electroconductive member may also be a multiple layer structure in which several intermediate layers and several adhesive layers are arranged. For the non-adhesion treatment of the outermost portion, available is a method in which the surface of the electroconductive member is irradiated with energy radiation such as electron beam, ultraviolet light, X-ray or microwave to harden the surface so as to be non-adhesive. On the surface of the electroconductive member, there can also be formed a surface layer made of an non-adhesive resin such as acrylic resin, polyurethane, polyamide, polyester, polyolefin or silicone resin.

When a surface layer is formed, the electrical resistance value of the surface layer is preferably designed to be $1\times10^3$ to $1\times10^9$ Ω·cm in terms of the volume intrinsic resistivity. In this case, by dispersing where necessary the following materials in an appropriate amount in the aforementioned non-adhesive resin, the electrical resistance value can be regulated to be an intended value; for example, carbon black; graphite; metal oxides such as titanium oxide and tin oxide; metals such as copper and silver; electroconductive particles to which electroconductivity is imparted by coating the surface of the particles with oxides or metals; inorganic ionic electrolytes such as $LiClO_4$, KSCN, NaSCN and $LiCF_3SO_3$; and quaternary ammonium salts.

(Electrophotographic Apparatus)

Figure 8:
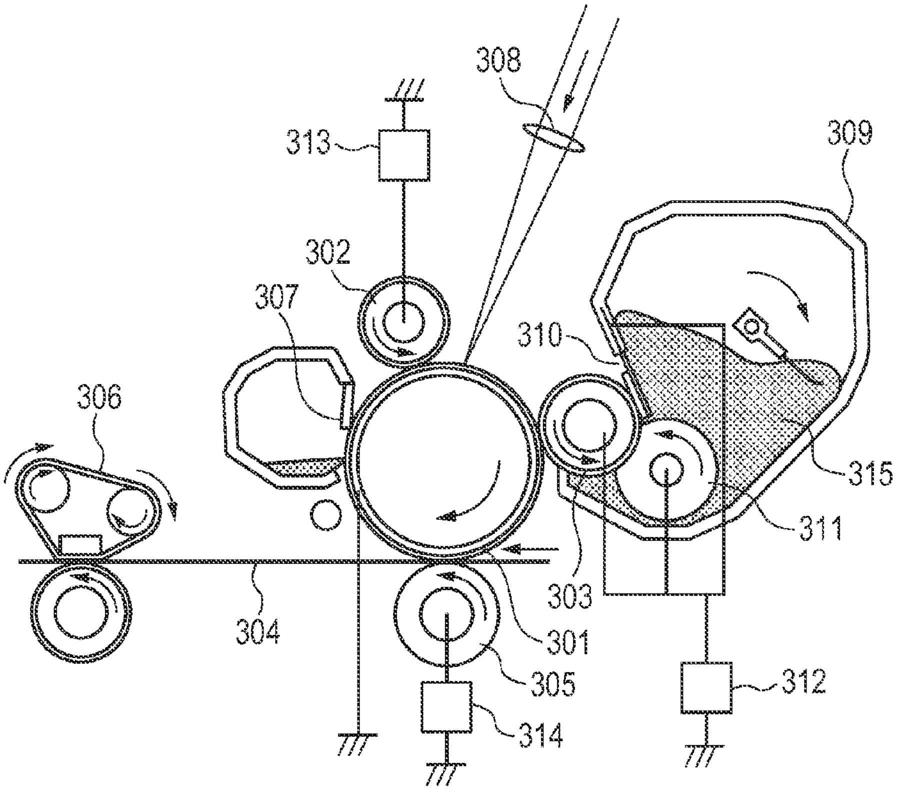
FIG. 8 is a view illustrating the electrophotographic apparatus according to the present invention.

FIG. 8 is a schematic view illustrating the electrophotographic apparatus using as the charging roller thereof the electroconductive member for use in electrophotography of the present invention. The electrophotographic apparatus is constituted with the charging roller 302 for charging the electrophotographic photosensitive member 301, a latent image forming apparatus 308 for performing exposure, a developing apparatus 303 for developing as a toner image, a transfer apparatus 305 for transferring to a transfer material 304, a cleaning apparatus 307 for recovering the transfer toner on the electrophotographic photosensitive member, a fixing apparatus 306 for fixing the toner image, and others. The electrophotographic photosensitive member 301 is of a rotating drum type having a photosensitive layer on an electroconductive substrate. The electrophotographic photosensitive member 301 is driven to rotate in the direction indicated by an arrow at a predetermined circumferential speed (process speed).

The charging roller 302 is placed so as to be in contact with the electrophotographic photosensitive member 301 by being pressed against the electrophotographic photosensitive member 301 with a predetermined force. The charging roller 302 is follow-up rotated with the rotation of the electrophotographic photosensitive member 301, and charges the electrophotographic photosensitive member 301 to a predetermined electric potential by applying a predetermined direct current voltage from a charging power supply 313. On the uniformly charged electrophotographic photosensitive member 301, an electrostatic latent image is formed by irradiating the electrophotographic photosensitive member 301 with the light 308 corresponding to the image information. To the surface of the developing roller 303 placed in contact with the electrophotographic photosensitive member 301, a developer 315 in a developing vessel 309 is fed with the aid of a developer feeding roller 311. Subsequently, with the aid of a developer amount controlling member 310, on the surface of the developing roller 303, a developer layer charged in the same polarity as the charging electric potential of the electrophotographic photosensitive member is formed. By using this developer, on the basis of the reversal phenomenon, the electrostatic latent image formed on the electrophotographic photosensitive member is developed. The transfer apparatus 305 has a contact type transfer roller. The toner image is transferred from the electrophotographic photosensitive member 301 to a transfer material 304 such as standard paper. The transfer material 304 is conveyed by a paper feed system having a conveying member. A cleaning apparatus 307 has a blade-type cleaning member and a recovery vessel, and recovers the transfer residual toner remaining on the electrophotographic photosensitive member 301 after performing transfer by mechanical scraping. In this connection, it is also possible to omit the cleaning apparatus 307 by adopting a cleaning-simultaneous-with-development method in which the developing apparatus 303 recovers the transfer residual toner. The fixing apparatus 306 is constituted with heated rolls and others, fixes the transferred toner image on the transfer material 304, and the transfer material 306 is discharged to outside the apparatus. In FIG. 8, direct current power supplies 312 and 314 are also shown.

(Process Cartridge)

Figure 9:
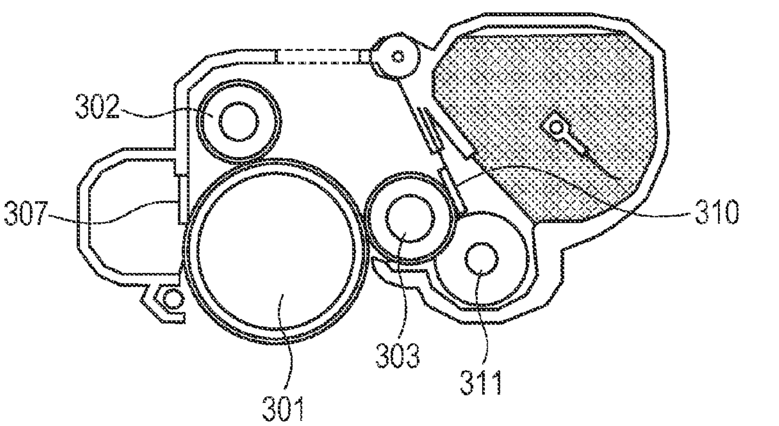
FIG. 9 is a view illustrating the process cartridge according to the present invention.

FIG. 9 is a schematic cross sectional view illustrating a process cartridge in which the electroconductive member for use in electrophotography according to the present invention is applied to the charging roller 302. As shown in FIG. 9, the process cartridge is configured in such a way that the electrophotographic photosensitive member 301, the charging roller 302, the developing apparatus 303 and the cleaning apparatus 307, and the process cartridge are integrally assembled, and the process cartridge is attachable to and detachable from the main body of the electrophotographic apparatus.

EXAMPLES

Hereinafter, specific Examples of the present invention are described.

[Synthesis of Electroconductive Agent]

Synthesis Examples 1 to 16 of the metal oxide particle in which sulfonic acid groups are introduced, that is, the electroconductive agent according to the present invention, and Synthesis Example 17 of the electroconductive agent used in Comparative Example 2 are presented below.

Synthesis Example 1

As the raw material metal oxide particle, 10.0 g of silica (trade name: Aerosil-150, manufactured by Aerosil Co., Ltd.) having a particle size of 100 nm was prepared. In a toluene solution containing 3.0 g of 1,3-propanesultone as added therein, the silica was immersed, and the mixture was refluxed at 120° C. for 24 hours. After the reaction, the reaction mixture was subjected to a centrifugal separation at 10000 rpm for 15 minutes, the supernatant was removed, and then the rest was dispersed in methanol. Then, reprecipitation with centrifugal separation and washing with methanol were performed. Thus, the silica onto which sulfonic acid groups were introduced was synthesized. The content of the sulfonic acid group in the obtained silica was calculated by using a Fourier transform infrared spectrophotometer (FT-IR). Consequently, the content of the sulfonic acid group was found to be 0.78 mmol/g.

Synthesis Examples 2 to 10

In each of Synthesis Examples 2 to 10, a metal oxide particle onto which sulfonic acid groups were introduced was prepared in the same manner as in Synthesis Example 1 except that the metal oxide particle and the sultone shown in Table 1 were used. The contents of the sulfonic acid group in the respective obtained metal oxide particles are shown in Table 1.

Synthesis Example 11

The silica having a particle size of 100 nm was subjected to a hydrothermal treatment at 170° C. for 24 hours by using an autoclave, and thus hydroxyl groups were introduced onto the surface of the silica. A silica onto which sulfonic acid groups were introduced was prepared in the same manner as in Synthesis Example 1 except that the silica thus obtained was used. The amount of the sulfonic acid groups introduced onto the silica particle was found to be 1.22 mmol/g.

Synthesis Example 12

Sulfonic acid groups were introduced in the same manner as in Synthesis Example 1 except that mesoporous silica having a BET specific surface area of 500 $m^2/g$ was used as the metal oxide particle. The content of the sulfonic acid group in the synthesized mesoporous silica was found to be 0.84 mmol/g. The mesoporous silica was synthesized as follows: 10.4 g of tetraethoxysilane, 5.4 g (0.01 M) of hydrochloric acid, 20 g of ethanol and 1.4 g of a polyethylene oxide-polypropylene oxide-polyethylene oxide ternary copolymer $[HO(CH_2CH_2O)_{20}(CH_2(CH(CH_3)O)_{70}(CH_2CH_2O)_{20}H]$ (trade name: Pluronic P-123, manufactured by Aldrich Corp.) were mixed with stirring for 1 hr; the resulting powdered was collected and baked at 400° C. for 4 hours to yield the concerned mesoporous silica.

Synthesis Example 13

As the raw material metal oxide particle, montmorillonite produced at the Tsukinuno Mine in Yamagata Prefecture, Japan was used; 10 g of the montmorillonite and 10.4 g of cetyltrimethyl ammonium bromide were stirred in 500 ml of water for 24 hours. After the reaction, the reaction mixture was subjected to a centrifugal separation at 10000 rpm for 15 minutes, the supernatant was removed, and then the rest was dispersed in methanol. Then, by performing reprecipitation with centrifugal separation and washing with methanol, a hydrophobic montmorillonite in which the interlamellar sodium ions were replaced with cetyltrimethyl ammonium ion was prepared.

In toluene, 10.0 g of the obtained hydrophobic montmorillonite was dispersed and 3.0 g of 1.3-propanesultone was added; then, the reaction mixture was refluxed at 120° C. for 24 hours. After the reaction, the reaction mixture was subjected to a centrifugal separation at 10000 rpm for 15 minutes, the supernatant was removed, and then the rest was dispersed in methanol. Then, by performing reprecipitation with centrifugal separation and washing with methanol, a montmorillonite onto the end faces of which sulfonic acid groups were introduced was prepared. The content of the sulfonic acid group in the synthesized montmorillonite was found to be 0.28 mmol/g.

Synthesis Example 14

Sulfonic acid groups were introduced onto magadiite in the same manner as in Synthesis Example 13 except that magadiite was used as the raw material metal oxide particle. The magadiite was synthesized as follows: 10 g of silica gel (Wako gel Q63, manufactured by Wako Pure Chemical Industries, Ltd.), 1.54 g of sodium hydroxide and 55.5 g of purified water were placed and sealed in a hermetically sealable PTFE vessel, and were allowed to react with each other at 150° C. for 48 hours under the hydrothermal conditions, to synthesize the magadiite.

Synthesis Example 15

Sulfonic acid groups were introduced onto acicular titanium oxide in the same manner as in Synthesis Example 1 except that acicular titanium oxide (trade name: MT-100T, manufactured by Tayca Corp.) (fiber diameter: 0.05 to 0.15 μm, fiber length: 3 to 12 μm) was used as the raw material metal oxide particle.

Synthesis Example 16

As the raw material metal oxide particle, 10.0 g of silica having a particle size of 100 nm was prepared. In a dimethylformamide solution containing 3.0 g of 2-chloroethanesulfonic acid as added therein, the silica was immersed, and the mixture was refluxed at 110° C. for 24 hours. After the reaction, the reaction mixture was subjected to a centrifugal separation at 10000 rpm for 15 minutes, the supernatant was removed, and then the rest was dispersed in methanol. Then, reprecipitation with centrifugal separation and washing with methanol were repeated twice to prepare the silica onto which sulfonic acid groups were introduced.

Synthesis Example 17

To a mixed solution including 1.8 ml of water, 100 μl of 35% hydrochloric acid and 10 ml of ethanol, 2 ml of mercaptopropyltrimethoxysilane was gradually dropwise added, and the resulting mixture was stirred at 50° C. for 1 hour. Then, the mixture was mixed with a solution prepared by dispersing 10.0 g of silica having a particle size of 100 nm as the raw material metal oxide particle in ethanol, and the resulting mixture was stirred at 70° C. for 13 hours. In a mixed solution including 40 ml of ethanol and 10 ml of an aqueous hydrogen peroxide solution, 10.0 g of the thus synthesized silica having mercapto groups was stirred at 70° C. for 2 hours to substitute the mercapto groups with sulfonic acid groups, and thus a silica onto which sulfonic acid groups were introduced was prepared.

TABLE 1

| Synthesis Example | Metal oxide particle: Type | Metal oxide particle: Particle size (nm) | Sulfonic acid group introducing agent: Type | Sulfonic acid group introducing agent: Used amount (g) | Introduced amount of sulfonic acid group (mmol/g) |
|---|---|---|---|---|---|
| 1 | Silica | 100 | 1,3-Propanesultone | 3.0 | 0.78 |
| 2 | Titanium oxide | 100 | 1,3-Propanesultone | 3.0 | 0.65 |
| 3 | Zirconium oxide | 20 | 1,3-Propanesultone | 3.0 | 0.52 |
| 4 | Aluminum oxide | 100 | 1,3-Propanesultone | 3.0 | 0.66 |
| 5 | Silica | 100 | 1,3-Propanesultone | 3.0 | 0.71 |
| 6 | Silica | 100 | 1,4-Butanesultone | 3.0 | 0.72 |
| 7 | Silica | 100 | 2,4-Butanesultone | 3.0 | 0.68 |
| 8 | Silica | 100 | 1,3-Propanesultone | 3.0 | 1.05 |
| 9 | Silica | 500 | 1,3-Propanesultone | 3.0 | 0.61 |
| 10 | Silica | 100 | 1,3-Propanesultone | 0.8 | 0.14 |
| 11 | Silica (hydrothermally processed) | 100 | 1,3-Propanesultone | 3.0 | 1.22 |
| 12 | Mesoporous silica | 100 | 1,3-Propanesultone | 3.0 | 0.84 |
| 13 | Montmorillonite | — | 1,3-Propanesultone | 3.0 | 0.28 |
| 14 | Magadiite | — | 1,3-Propanesultone | 3.0 | 0.70 |
| 15 | Acicular titanium oxide | — | 1,3-Propanesultone | 3.0 | 0.65 |

TABLE 1-continued

| Synthesis Example | Metal oxide particle: Type | Metal oxide particle: Particle size (nm) | Sulfonic acid group introducing agent: Type | Sulfonic acid group introducing agent: Used amount (g) | Introduced amount of sulfonic acid group (mmol/g) |
|---|---|---|---|---|---|
| 16 | Silica | 100 | 2-Chloroethanesulfonic acid | 3.0 | 0.31 |
| 17 | Silica | 100 | Mercaptopropyltrimethoxysilane | 2 ml | 0.73 |

Example 1

A charging roller was prepared according to the following procedure and evaluated.

(1. Preparation of Electroconductive Composition)

As the binder resin, an epichlorohydrin-ethylene oxide-allyl glycidyl ether ternary copolymer (hereinafter, abbreviated as "GECO") (trade name: Epichlomer CG-102, manufactured by Dasio Co., Ltd.) was used, and thus the respective materials of types and amounts shown in Table 2 were prepared.

TABLE 2

| Raw material | Used amount parts by mass |
|---|---|
| Epichlorohydrin-ethylene oxide-allyl glycidyl ether ternary copolymer (trade name: Epichlomer CG-102, manufactured by Daiso Co., Ltd.) (Note 1) Abbreviated as GECO | 100 |
| Electroconductive agent, having introduced sulfonic acid groups, according to Synthesis Example 1 | 10 |
| Zinc oxide (Zinc oxide, second type, manufactured by Seido Chemical Industry Co., Ltd.) | 50 |
| Calcium carbonate (trade name: Silver W, manufactured by Shiraishi Calcium Kaisha, Ltd. ) | 35 |
| Carbon black (trade name: Seast SO, manufactured by Tokai Carbon Co., Ltd.) | 8 |
| Stearic acid (processing aid) | 2 |
| Adipic acid ester (plasticizer) (trade name: Polysizer W305ELS, manufactured by Nippon Ink and Chemicals Inc.) | 10 |
| Sulfur (vulcanizing agent) | 0.5 |
| Dipentamethylene thiuram tetrasulfide (cross-linking aid) (trade name: Noccelar TRA, manufactured by Ouchi Shinko Chemical Industrial Co., Ltd.) | 2 |

These materials were mixed with an open roll to yield a nonvulcanized rubber composition. The type of the binder resin, the type of the electroconductive agent and the mixing proportions of these are shown in Table 4.

(2. Formation of Electroconductive Layer)

Next, a crosshead having a feed mechanism for the mandrel and a discharge mechanism for the roller was prepared, a die having an inner diameter of φ90.0 mm was fixed to the crosshead, and the temperatures of the extruder and the crosshead were regulated at 80° C., and the conveying speed of the mandrel was regulated at 60 mm/sec. The mandrel was made of a stainless steel (SUS304), and was 6 mm in outer diameter and 258 mm in total length. Under such conditions, the nonvulcanized rubber composition was fed from the extruder and thus a mandrel the surface of which was coated with the nonvulcanized rubber composition was obtained. Next, the mandrel covered with the nonvulcanized rubber composition was placed in a hot air vulcanizing furnace set at 170° C. and heated for 60 minutes. Subsequently, the end portions of the electroconductive layer were cut and removed so as for the length of the electroconductive layer to be 228 mm. Finally, the surface of the electroconductive layer was polished with a grindstone. Thus, prepared was an electroconductive elastic roller in which the central position diameter was 8.5 mm and the diameters of the positions respectively separated from the central position by ±90 mm were 8.4 mm, and an electroconductive layer was formed on the outer periphery of the electroconductive mandrel.

(3. Formation of Surface Layer)

To a caprolactone-modified acrylic polyol solution, methyl isobutyl ketone was added to regulate the solid content to be 18% by mass. The materials shown in Table 3 were added in relation to 100 parts by mass of the solid content of the acrylic polyol solution, to prepare a mixed solution.

TABLE 3

| Materials | parts by mass |
|---|---|
| Carbon black (HAF) | 16 |
| Acicular rutile type titanium oxide fine particle | 35 |
| Modified dimethylsilicone oil | 0.1 |
| 7:3 mixture of hexamethylene diisocyanate (HDI) butanone oxime block product and isophorone diisocyanate (IPDI) butanone oxime block product (A mixture of the block HDI and the block IPDI was added so as for the relation NCO/OH = 1.0 to be satisfied.) | 80.14 |

In a 450-ml glass bottle, 210 g of the aforementioned mixed solution and 200 g of glass beads having an average particle size of 0.8 mm as media were mixed, and dispersed for 24 hours with a paint shaker disperser. After dispersion, 5.44 parts by mass (an amount corresponding to 20 parts by mass in relation to 100 parts by mass of acrylic polyol) of a cross-linked type acrylic particle "MR 50G" (manufactured by Soken Chemical & Engineering Co., Ltd.) was added as a resin particle, and then the resulting mixture was further dispersed for 30 minutes to yield a surface layer forming coating material. The electroconductive elastic roller was once coated with this coating material by dip coating and air dried at normal temperature for 30 minutes or more. Successively, the coated electroconductive elastic roller was dried for 1 hour with a hot air circulation drier set at 90° C., and further dried for 1 hour with a hot air circulation drier set at 160° C. to form a surface layer on the electroconductive elastic roller. The dipping time in the dip coating was 9 seconds, the dip coating draw-up rate was regulated so as for the initial rate to be 20 mm/sec and for the final rate to be 2 mm/sec, and the dip coating draw-up rate was varied linearly in terms of time between the draw-up rates of 20 mm/sec and 2 mm/sec. In this way, a charging roller having a surface layer on the outer periphery of the electroconductive layer was prepared. The thus obtained charging roller was subjected to the following tests and evaluated.

(Measurement of Electrical Resistance (Initial Value) and Electrical Resistance after Endurance Test, and Derivation of Increase Percentage of Electrical Resistance after Endurance Test Relative to Electrical Resistance (Initial Value))

Figure 7:
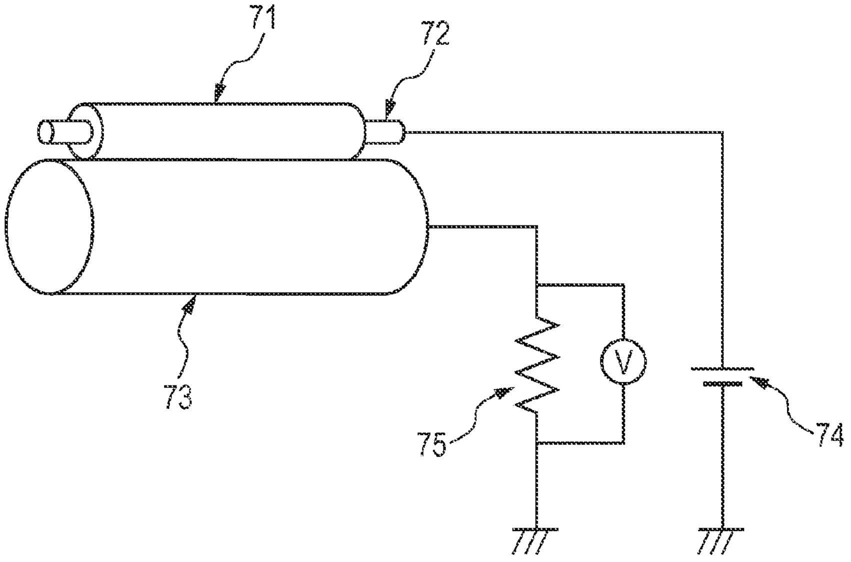
FIG. 7 is a schematic diagram illustrating an electrical resistance measurement apparatus.

FIG. 7 is a schematic configuration diagram illustrating an apparatus for measuring the electrical resistance of the charging roller. The charging roller 71 is pressed to contact with a columnar aluminum drum of 30 mm in diameter by pressing the both ends of the mandrel 72 with not-shown pressing units, and the charging roller 71 is follow-up rotated with the rotary drive of the aluminum drum 73. In this condition, a direct current voltage is applied to the mandrel portion 72 of the charging roller 71 by using an external power supply 74, and the voltage across a standard resistor 75 serially connected to the aluminum drum 73 is measured. The electrical resistance of the charging roller 71 can be derived by determining the current value flowing in the circuit from the measured voltage across the standard resistor.

In present Example, the electrical resistance of the charging roller was measured in an environment of a temperature of 23° C. and a humidity of 50% R.H. (also described as NN), with the apparatus shown in FIG. 7, by applying a direct current voltage of 200 V for 2 seconds between the mandrel and the aluminum drum. In this case, the number of rotations of the aluminum drum was 30 rpm and the resistance value of the standard resistor was 100Ω. The sampling of the data was performed for 1 second from an elapsed time of 1 second after the application of the voltage, with a frequency of 20 Hz, and the average value of the obtained electrical resistance values was taken as the resistance value of the charging roller.

Specifically, the initial electrical resistance value and the electrical resistance value, after the direct current was made to flow, of the charging roller were measured as follows. By using the apparatus shown in FIG. 7, in the same manner as in the foregoing measurement of the electrical resistance, the electrical resistance was measured with a direct current voltage of 200 V applied between the mandrel and the aluminum drum for 2 second. In this case, the number of rotations of the aluminum drum was 30 rpm and the resistance value of the standard resistor was 100Ω.

Next, while the aluminum drum was being rotated at rpm, a direct current voltage of 200 V was applied between the mandrel and the aluminum drum for 10 minutes to energize the charging roller. Then, in the same manner as in the foregoing measurement, the electrical resistance of the charging roller was again measured. The resistance increase percentage (%) was defined as a value obtained by dividing the electrical resistance of the charging roller after the application of the direct current voltage of 200 V for 10 minutes by the electrical resistance (initial value) of the charging roller before the application of the direct current voltage of 200 V, then multiplying the resulting quotient by 100.

Examples 2 to 23

In each of Examples 2 to 23, a charging roller was prepared in the same manner as in Example 1 except that the binder resin and the electroconductive agent and the amounts thereof were altered as shown in Table 4, and the resulting charging roller was evaluated. In Example 8, acrylonitrile-butadiene copolymer (NBR) (trade name: Nipol DN219, manufactured by Zeon Corp.) was used as the binder resin.

Comparative Examples 1 and 2

Charging rollers were prepared in the same manner as in Example 1 except that in place of the electroconductive agent of Synthesis Example 1, an unprocessed silica particle or the electroconductive agent of Synthesis Example 17 was used.

Evaluation results for Examples 1 to 23 and Comparative Examples 1 and 2 are shown in Table 4.

TABLE 4

| | Binder resin | | Electroconductive agent or substitute | | | Introduced | Evaluation of charging roller | |
|---|---|---|---|---|---|---|---|---|
| | Type | Used amount parts by mass | Type | Used amount parts by mass | Particle size nm | amount of sulfonic acid group mmol/g | Volume resistivity (initial) Ω · cm | Resistance increase percentage % |
| Example 1 | GECO | 100 | Synthesis Example 1 | 10 | 100 | 0.78 | $4.6 \times 10^6$ | 117 |
| Example 2 | GECO | 100 | Synthesis Example 2 | 10 | 100 | 0.65 | $6.5 \times 10^6$ | 115 |
| Example 3 | GECO | 100 | Synthesis Example 3 | 10 | 20 | 0.52 | $8.5 \times 10^6$ | 123 |
| Example 4 | GECO | 100 | Synthesis Example 4 | 10 | 100 | 0.66 | $7.6 \times 10^6$ | 122 |
| Example 5 | GECO | 100 | Synthesis Example 5 | 10 | 100 | 0.71 | $5.1 \times 10^6$ | 124 |
| Example 6 | GECO | 100 | Synthesis Example 6 | 10 | 100 | 0.72 | $8.9 \times 10^6$ | 115 |
| Example 7 | GECO | 100 | Synthesis Example 7 | 10 | 100 | 0.68 | $9.0 \times 10^6$ | 116 |
| Example 8 | NBR | 100 | Synthesis Example 1 | 10 | 100 | 0.78 | $4.1 \times 10^8$ | 139 |
| Example 9 | GECO | 100 | Synthesis Example 8 | 5 | 50 | 1.05 | $3.2 \times 10^7$ | 112 |
| Example 10 | GECO | 100 | Synthesis Example 1 | 5 | 100 | 0.78 | $3.3 \times 10^7$ | 115 |
| Example 11 | GECO | 100 | Synthesis Example 9 | 5 | 500 | 0.61 | $7.4 \times 10^8$ | 135 |
| Example 12 | GECO | 100 | Synthesis Example 8 | 10 | 50 | 1.05 | $6.9 \times 10^6$ | 119 |
| Example 13 | GECO | 100 | Synthesis Example 9 | 10 | 500 | 0.61 | $4.6 \times 10^8$ | 129 |
| Example 14 | GECO | 100 | Synthesis Example 8 | 50 | 50 | 1.05 | $4.9 \times 10^6$ | 119 |
| Example 15 | GECO | 100 | Synthesis Example 1 | 50 | 100 | 0.78 | $4.1 \times 10^6$ | 118 |
| Example 16 | GECO | 100 | Synthesis Example 9 | 50 | 500 | 0.61 | $2.2 \times 10^8$ | 142 |
| Example 17 | GECO | 100 | Synthesis Example 10 | 10 | 100 | 0.14 | $9.6 \times 10^7$ | 138 |
| Example 18 | GECO | 100 | Synthesis Example 11 | 10 | 100 | 1.22 | $4.4 \times 10^6$ | 125 |
| Example 19 | GECO | 100 | Synthesis Example 12 | 10 | 100 | 0.84 | $6.3 \times 10^6$ | 124 |
| Example 20 | GECO | 100 | Synthesis Example 13 | 10 | — | 0.28 | $5.5 \times 10^8$ | 136 |
| Example 21 | GECO | 100 | Synthesis Example 14 | 10 | — | 0.7 | $2.8 \times 10^7$ | 118 |
| Example 22 | GECO | 100 | Synthesis Example 15 | 10 | — | 0.65 | $6.2 \times 10^7$ | 146 |
| Example 23 | GECO | 100 | Synthesis Example 16 | 10 | 100 | 0.31 | $6.3 \times 10^7$ | 139 |
| Comparative Example 1 | GECO | 100 | Silica | 10 | 100 | — | $7.9 \times 10^9$ | 214 |
| Comparative Example 2 | GECO | 100 | Synthesis Example 17 | 10 | 100 | 0.73 | $9.8 \times 10^6$ | 198 |

Example 24

A developing roller was prepared according to the following procedure and evaluated.

(1. Preparation of Electroconductive Composition)

The materials shown in Table 2 were mixed with an open roll to yield a nonvulcanized rubber composition. The type of the binder resin, the type of the electroconductive agent and the mixing proportions of these are shown in Table 6.

(2. Formation of Electroconductive Layer)

Next, by using the crosshead extruder, in the same manner as in Example 1, there was prepared a developing roller in which an electroconductive layer was formed on the outer periphery of an electroconductive mandrel of 12 mm in diameter.

(3. Formation of Surface Layer)

As the materials for the surface layer, the materials shown in below-presented Table 5 were mixed and stirred.

TABLE 5

| Materials | parts by mass |
|---|---|
| Acrylic polyol (trade name: Hitaloid 3001, manufactured by Hitachi Chemical Co., Ltd.) | 100 |
| Polyisocyanate (trade name: Colonate L, Nippon Polyurethane Industry Co., Ltd.) | 12.1 |
| Carbon black MA230 (trade name, manufactured by Mitsubishi Chemical Corp.) | 16.7 |

Then, the mixed materials were dissolved and mixed in methyl ethyl ketone so as for the total solid content proportion to be 30% by mass, and then the resulting solution was uniformly dispersed with a sand mill to yield a surface layer forming coating material. The coating material was diluted with methyl ethyl ketone so as for the viscosity of the coating material to be 10 to 13 cps, and then the electroconductive layer was dip-coated with the diluted coating material with a liquid circulation type dip coating apparatus and then dried. Then, the coated electroconductive layer was heat treated at a temperature of 150° C. for 1 hour to yield a developing roller in which a surface layer of about 20 μm in film thickness was provided on the outer periphery of the electroconductive layer. The thus obtained developing roller was subjected to the following tests and evaluated.

(Measurements of Electrical Resistance and Degradation after Applying DC)

The same electrical resistance measurement apparatus as in Example 1 was used. The resistance of the developing roller was measured in the environment of a temperature of 20° C. and a humidity of 40% R.H. (also described as NN) with a direct current voltage of 100 V applied between the mandrel and the aluminum drum for 2 second. In this case, the number of rotations of the aluminum drum was 60 rpm and the resistance value of the standard resistor was 100Ω. The sampling of the data was performed for 1 second from an elapsed time of 1 second after the application of the voltage, with a frequency of 20 Hz, and the average value of the obtained electrical resistance values was taken as the resistance value of the developing roller.

The evaluation of the degradation of the developing roller after applying direct current, was performed in the same manner as in Example 1. In this case, the measurement of the initial electrical resistance was performed under the above-described conditions. The conditions at the time of energization were such that the number of rotations of the aluminum drum was 60 rpm, the voltage applied between the mandrel and the aluminum drum was a direct current voltage of 100 V, and the voltage application time was 60 minutes.

Examples 25 and 26

Developing rollers were prepared in the same manner as in Example 24 except that the types of the electroconductive agents were altered as shown in Table 6, and the resulting developing rollers were evaluated.

Comparative Example 3

A developing roller was prepared in the same manner as in Example 24 except that an untreated silica having a particle size of 100 nm was used in place of the electroconductive agent according to Synthesis Example 1, and the resulting developing roller was evaluated.

The evaluation results of Examples 24 to 26 and Comparative Example 3 are shown in Table 6.

TABLE 6

| | Binder resin | | Electroconductive agent or substitute | | | | Evaluation of developing roller | |
|---|---|---|---|---|---|---|---|---|
| | Type | Used amount parts by mass | Type | Used amount parts by mass | Particle size nm | Introduced amount of sulfonic acid group mmol/g | Volume resistivity (after applying DC for 60 min.) Ω · cm | Resistance increase percentage % |
| Example 24 | GECO | 100 | Synthesis Example 1 | 10 | 100 | 0.78 | $1.6 \times 10^7$ | 126 |
| Example 25 | GECO | 100 | Synthesis Example 2 | 10 | 100 | 0.65 | $2.2 \times 10^7$ | 126 |
| Example 26 | GECO | 100 | Synthesis Example 10 | 10 | 100 | 0.14 | $6.5 \times 10^7$ | 169 |
| Comparative Example 3 | GECO | 100 | Silica | 10 | 100 | — | $8.6 \times 10^7$ | 241 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-163022, filed Jul. 20, 2010, which is hereby incorporated by reference herein in its entirety.

What is claimed is:

1. An electroconductive member comprising an electroconductive mandrel and an electroconductive layer, wherein said electroconductive layer comprises a binder resin and an electroconductive metal oxide particle dispersed in the binder resin, said metal oxide particle has a group represented by the following structural formula (1) on the surface of the metal oxide particle, and wherein said group represented by the following structural formula (1) is a group introduced by substituting a hydrogen atom of a hydroxyl group as a functional group originated from the metal oxide particle, with said group represented by the following structural formula (1):

$$—R—SO_3H \qquad (1)$$

wherein, in the structural formula (1), R represents a divalent saturated hydrocarbon group having 1 to 4 carbon atoms.

2. The electroconductive member according to claim 1, wherein said group represented by the structural formula (1) is a group introduced by a reaction between said hydroxyl group and sultone.

3. The electroconductive member according to claim 2, wherein said sultone is represented by the following structural formula (2):

(2)

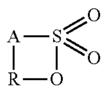

wherein, in the structural formula (2), R is a substituted or nonsubstituted alkylene group having 1 or 2 carbon atoms or a nonsubstituted alkenylene group having 1 or 2 carbon atoms, A is —C(R')(R")—, and R' and R" are each independently a hydrogen atom or an alkyl group having 1 or 2 carbon atoms.

4. A process cartridge formed so as to be attachable to and detachable from a main body of an electrophotographic apparatus, wherein said process cartridge comprises the electroconductive member according to claim 1 as at least one of a charging member and a developing member.

5. An electrophotographic apparatus comprising the electroconductive member according to claim 1 as at least one of a charging member and a developing member.

* * * * *